United States Patent [19]

Molloy et al.

[11] 3,917,679

[45] Nov. 4, 1975

[54] QUATERNARY AMMONIUM SALTS OF N-DIALKYLAMINOALKYL-N-(2-INDANYL)ANILINES

[75] Inventors: Bryan B. Molloy; Ronald R. Tuttle, both of Indianapolis, Ind.

[73] Assignee: Eli Lilly and Company, Indianapolis, Ind.

[22] Filed: Apr. 12, 1974

[21] Appl. No.: 460,643

[52] U.S. Cl. 260/501.15; 260/247.1 E; 260/247.2 R; 260/247.5 R; 260/293.62; 260/326.85; 260/567.6 M; 424/329; 424/248; 424/267; 424/274
[51] Int. Cl.² .......................................... C07C 87/46
[58] Field of Search 260/247.5 R, 567.6 M, 326.85, 260/293.62, 501.15

[56] References Cited
UNITED STATES PATENTS

| | | | |
|---|---|---|---|
| 3,459,745 | 8/1969 | Fouche | 260/567.6 M X |
| 3,468,951 | 9/1969 | Cho | 260/567.6 M X |
| 3,718,694 | 2/1973 | Eriksoo et al. | 260/567.6 M X |
| 3,829,469 | 8/1974 | Thiele et al. | 260/567.6 M X |
| 3,875,215 | 4/1975 | Strycker | 260/562.6 M |

FOREIGN PATENTS OR APPLICATIONS

| | | | |
|---|---|---|---|
| 910,907 | 9/1972 | Canada | 260/247.5 |

*Primary Examiner*—James A. Patten
*Assistant Examiner*—Richard D. Kelly
*Attorney, Agent, or Firm*—Charles W. Ashbrook; Walter E. Buting; Everet F. Smith

[57] ABSTRACT

Novel quaternary ammonium salts of lower dialkylaminoalkyl derivatives of N-(2-indanyl)anilines are potent antiarrhythmic agents.

8 Claims, No Drawings

QUATERNARY AMMONIUM SALTS OF N-DIALKYLAMINOALKYL-N-(2-INDANYL)ANILINES

BACKGROUND OF THE INVENTION

This invention relates to compounds which display antiarrhythmic activity. In particular, this invention relates to novel quaternary ammonium salts of dialkylaminoalkyl derivatives of 2-aminoindanes.

Because of the serious consequences associated with heart diseases in general, there has long been strong interest in agents that display an effect upon the cardiac muscle. There are several drugs currently available which are useful in the treatment of disorders of heart rate and rhythm, probably the most notable one to date being quinidine. Quinidine has been used extensively for control of cardiac arrhythmias in humans since 1921, even through very serious side effects, and even death, often accompany its continued use. Propanolol is a β-adrenergic blocking agent which also displays quinidine-like actions on the heart, and has been used to a limited extent for the control of cardiac arrhythmias. Its use as an antiarrhythmic agent, however, demands great care because of its undesirable side effects. Procaine was made available in 1936 and has been used to some extent as an antiarrhythmic agent, however its usefulness is limited by its short duration of action and by its prominent effects upon the central nervous system. Procainamide was found to be similar to procaine pharmacologically and to possess the advantages over procaine of longer duration of action and of a more favorable ratio between its cardiac and central nervous system activities. In recent years, lidocaine has been used extensively as an antiarrhythmic agent, particularly in the emergency treatment of ventricular arrhythmias encountered during cardiac surgery of resulting myocardial infarction. Convulsions are sometimes encountered as a side effect with lidocaine usage.

Extensive research has been directed to the preparation and study of compounds, both naturally occuring and synthetic, which display effects upon heart rate and rhythm. Recent research has led to the synthesis of a series of 2-aminoindane derivatives which have displayed potent antiarrhythmic activity. In particular, several N,N-dialkyl-N'-phenyl-N'-2-indanyl alkylenediamines have shown good potential as pharmacological agents useful as local anaesthetic agents and in controlling heart arrhythmias. These compounds are described in detail in Canadian Pat. No. 910907. Among these compounds, N-phenyl-N-diethylaminopropyl-2-aminoindane is of particular importance for the treatment of heart arrhythmia. While several of these 2-aminoindane derivatives are excellent antiarrhythmic agents, their continued use in particular cases is sometimes accompanied by somewhat undesirable side effects.

It is an object of this invention to provide new compounds which are quaternary ammonium salts of these known substituted aminoalkyl derivatives of 2-aminoindanes and which salts display excellent antiarrhythmic activity. It is a further object of this invention to provide quaternary ammonium salts of amines which display improved properties over the parent amines such as, for example, enhanced duration of action, decreased central nervous system side effects, different solubility properties, and other properties that will become apparent from the detailed description hereinbelow.

SUMMARY OF THE INVENTION

In fulfillment of the above and other objects, this invention provides compounds having the formula

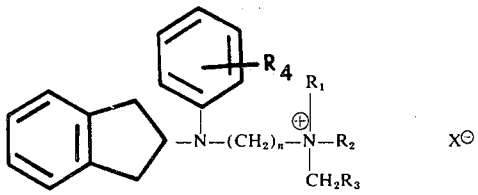

in which $n$ is 2 or 3, $R_1$ and $R_2$ independently are lower alkyl, or $R_1$ and $R_2$ together with the adjacent nitrogen atom form a nitrogen containing heterocyclic ring; $R_3$ is lower alkyl or lower alkenyl; $R_4$ is hydrogen, methyl, methoxy, trifluoromethyl or chloro; and X is an anion associated with the terminal quaternary nitrogen atom.

The new quaternary ammonium salts provided by this invention are prepared by treating a tertiary amine with an alkylating agent. Alternatively, the salts are prepared by displacing with an amine a displaceable group, such as chlorine or bromine for instance, from a suitably substituted haloalkylaminoindane derivative.

DETAILED DESCRIPTION OF THE INVENTION

As hereinbefore indicated, the compounds of this invention have the formula

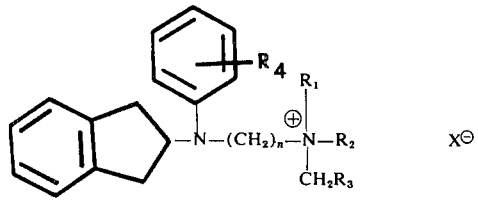

$R_1$ and $R_2$ in the foregoing formula can be the same or can be different, and are $C_1$–$C_4$ alkyl, or $R_1$ and $R_2$ together with the adjacent nitrogen atom can form a ring system selected from among pyrrolidino, piperidino, and morpholino. Examples of $C_1$–$C_4$ alkyl groups include methyl, ethyl, n-propyl, isopropyl and isobutyl.

$R_3$ is hydrogen, $C_1$–$C_3$ alkyl, or $C_2$–$C_5$ alkenyl. Typical $C_1$–$C_3$ alkyl groups include methyl, ethyl, n-propyl, and isopropyl. Examples of $C_2$–$C_5$ alkenyl groups include both straight and branched alkenyl groups such as ethenyl, 2-propenyl, 1-butenyl, 3-butenyl, 1-pentenyl, 2-methyl-2-butenyl, 3-pentenyl, 1,1-dimethyl-2-propenyl, and the like.

$R_4$ is a substituent on the phenyl ring selected from among hydrogen, methyl, methoxy, trifluoromethyl, and chloro.

X is an anion associated with the terminal ammonium nitrogen atom. The anion can be inorganic or organic. The particular nature of the anion X is not critical; however, the quaternary salt formed must be pharmaceutically acceptable and substantially non-toxic to animal organisms. The anions which form pharmaceutically acceptable salts are well-known to chemists and biologists, and include such anions as chloride, bromide, iodide, acetate, hydroxide, lactate, sulfate, and nitrate. Alkylsulfates, as well as alkyl and aryl sulfonates, for example, methanesulfate, methanesulfonate, benzenesulfonate, and the like, can also serve as suitable anions.

The following compounds are illustrative of the quaternary ammonium salts provided by the present invention:

Diethylmethyl-3[N-(2-indanyl)anilino]propylammonium iodide;
Dimethylethyl-3[N-(2-indanyl)-3-methylanilino]-propylammonium nitrate;
Allylmethylpropyl-3[N-(2-indanyl)anilino]propylammonium bromide;
Methyl-3[N-(2-indanyl)anilino]propylpiperidinium methanesulfate;
n-Butyl-3[N-(2-indanyl)-2-chloroanilino]propylpyrrolidinium nitrate;
Allylethylpropyl-3[N-(2-indanyl)anilino]propylammonium ethylsulfonate;
Diethyl-3-butenyl-3[N-(2-indanyl)anilino]propylammonium iodide;
Triethyl-3[N-(2-indanyl)anilino]propylammonium chloride;
Diethyl-5-hexenyl-3[N-(2-indanyl)-4-trifluoromethylanilino]-propylammonium iodide;
Diethylmethyl-3[N-(2-indanyl)anilino]propylammonium methanesulfate;
Diethylmethyl-3[N-(2-indanyl)-4-methoxyanilino]-propylammonium acetate;
Diisopropylmethyl-3[N-(2-indanyl)-3-methylanilino]-propylammonium bromide;
Ethyl-3[N-(2-indanyl)anilino]propylmorpholinium iodide;
Diethylisopropyl-3[N-(2-indanyl)anilino]propylammonium hydroxide;
Ethylmethylpropyl-2[N-(2-indanyl)anilino]ethylammonium acetate;
Diethylmethyl-2[N-(2-indanyl)anilino]ethylammonium iodide;
Tri-n-propyl-2[N-(2-indanyl)anilino]ethylammonium benzenesulfonate.

The novel quaternary ammonium salts provided herein are generally prepared by condensing an alkylating agent with an N,N-dialkyl-N'-phenyl-N'-2-indanyl alkylenediamine. The quaternization can be accomplished by reaction with a variety of alkylating agents, including alkyl halides, alkenyl halides, alkylsulfates, alkarylsulfonates, and the like. Typical examples of preferred alkylating agents include methyl iodide, ethyl bromide, n-propyl iodide, allyl bromide, 4-hexenyl iodide, isopropyl iodide, secondary butyl bromide, methyl sulfate, ethyl sulfate, butyl sulfate, methyl p-toluenesulfonate, and the like. The quaternization is preferably carried out in an unreactive organic solvent, the particular solvent selected not being of a critical nature. Generally, solvents such as benzene, acetone, methyl ethyl ketone, diethyl ether, dipropyl ether, methanol, ethanol, isopropanol, and the like, are suitable as reaction solvents. The reactants are generally commingled in equimolar amounts; however, an excess of either reactant can be used if desired. The reaction is normally carried out at a temperature below about 100°C., and is generally complete within about 2 to about 20 hours. The quaternary salts are typically crystalline solids, and can be recovered by filtration of the reaction mixture. If desired, further purification of the salt can be accomplished by recrystallization, for example from solvents such as ethanol, water, ethyl acetate, or the like.

An alternative method of preparation of the quaternary salts comprises amination of an N-haloalkyl-N-indanylaniline, such as an N-(3-chloropropyl)-N-(2-indanyl)aniline, for example. The amination is preferably carried out by treating such a substituted haloalkylaniline with a tertiary amine, thereby displacing the halogen atom with the amino group and forming the quaternary halide. Typical tertiary amines useful in amination reactions include trimethylamine, triethylamine, diethylmethylamine, tri-n-butylamine, N-methylpiperidine, allyldiethylamine, and the like. The aminating amine can be a primary or secondary amine. However, the products derived thereby are secondary and tertiary amines respectively which must be further alkylated by standard procedures to provide the quaternary ammonium salts of the invention.

If the anion of the quaternary ammonium salt is a halide, such anion can, if desired, by replaced by a different anion, either directly by metathesis or, alternatively, through the corresponding hydroxide. More specifically, a quaternary ammonium halide can be treated with aqueous silver oxide, which reacts to form silver halide and the corresponding quaternary ammonium hydroxide. By neutralization of the quaternary ammonium hydroxide so formed with the appropriate acid, the desired salt can be formed. Typical acids commonly used include methanesulfonic acid, p-toluenesulfonic acid, formic acid, butyric acid, nitric acid, and the like. A typical conversion, for example, comprises treating a trialkyl-3[N-(2-indanyl)anilino]propylammonium halide with wet silver oxide to provide the quaternary ammonium hydroxide, then treating the hydroxide with an acid, for instance acetic acid, thus providing the corresponding ammonium acetate.

The starting materials for preparing the quaternary ammonium salts of this invention are prepared by known general methods. The preferred starting materials for preparing the quaternary salts of this invention are N-dialkylaminoalkyl-N-(2-indanyl)anilines, which compounds are normally prepared according to the process disclosed in Canadian Pat. No. 910907. Generally, a 2-indanylaniline is treated with a haloalkyldialkylamine in the presence of a base to provide the corresponding N-dialkylaminoalkyl-N-(2-indanyl)aniline. The 2-indanylanilines required for the above process are generally prepared by condensing a 2-indanylmethanesulfonate with an aniline to provide the 2-indanylaniline. The 2-indanylmethanesulfonate is prepared by the method of Sam et al., J. Pharm. Science, Vol. 53, No. 11 (1964), page 1367.

The reaction of a 2-indanylaniline with a haloalkyldialkylamine is normally carried out in an organic solvent, such as benzene for example, preferably at the reflux temperature. A base such as sodium amide is used to convert the 2-indanylaniline into its salt, which then reacts with the haloalkyldialkylamine to displace halogen. According to Canadian Pat. No. 910907, the salts of 2-indanylanilines are treated with chloralkyldialkylamines. It will be understood, however, that haloalkyldialkylamines in general, wherein halo refers to halogen of atomic number less than 85, preferably chlorine, bromine or iodine, can be used.

An alternative process for preparing the starting materials for the compounds of this invention comprises treating the salt of a 2-indanylaniline with a haloalkylamine, wherein the haloalkylamine can be a primary or a secondary amine. The products of such condensation reactions are N-aminoalkyl-N-(2-indanyl)anilines or N-alkylaminoalkyl-N-(2-indanyl)anilines, respectively. These amines are further alkylated by known alkylation procedures to provide the desired N-dialkylaminoalkyl-N-(2-indanyl)anilines.

Other starting materials useful for preparing the compounds of this invention are N-haloalkyl-N-(2-indanyl) anilines. These compounds are prepared by reaction of a salt of a 2-indanylaniline, such as the sodium salt for example, with a 1,2-dihaloethane or a 1,3-dihalopropane. These reactions are preferably carried out in an organic solvent, such as benzene or dichloromethane for example, and normally at a temperature below about 100°C.

As hereinbefore indicated, the compounds of this invention are quaternary ammonium salts of known N-dialkylaminoalkyl-N-(2-indanyl)anilines. The compounds of this invention are valuable as local anaesthetic agents but are particularly useful for the treatment of cardiac arrhythmias in humans. While the overall potency of the compounds provided herein is essentially the same as that of the parent N-dialkylaminoalkyl-N-(2-indanyl)anilines, the quaternary salts of this invention have demonstrated distinct and unexpected advantages which make them extremely important pharmacological agents. In particular, the quaternary salts have displayed a longer duration of action when compared to the parent amines.

This difference is clearly displayed in Table I, which shows the effect of diethyl-3[N-(2-indanyl)anilino]-propylamine (tertiary amine) and diethylmethyl-3[N-(2-indanyl)anilino]propylammonium methanesulfate (quaternary salt) on mongrel dogs which were given effective doses of Ouabain to induce experimental cardiac arrhythmia. In Table I, the "Converting Dose" is the amount of test compound administered which was sufficient to convert the arrhythmia to normal sinus rhythm. When the normal sinus rhythm was attained, as shown by electrocardiogram, an additional identical dose of test compound was given, and "Total Dose" is the sum of the doses. The "Duration of Conversion" is the time in minutes that normal sinus rhythm is maintained. From Table I, it can be seen that the quaternary salt is more potent and has a longer duration of action than the parent tertiary amine.

TABLE I

| | Ouabain Dose µg/Kg | Converting Dose mg/Kg | Total Dose mg/Kg | Duration of Conversion Minutes |
|---|---|---|---|---|
| Tertiary amine | 70 | 0.8 | 1.6 | 49 |
| Quaternary salt | 70 | 0.6 | 1.2 | >120 |

An even more important advantage of the quaternary ammonium salts is their increased safety of use. More specifically, in vivo tests conducted on mongrel dogs have shown that the quaternary salts are safer than the parent amines when used in episodes of acute myocardial infarction. Table II shows the effects of diethyl-3[N-(2-indanyl)anilino]propylamine and diethylmethyl-3[N-(2-indanyl)anilino]propylammonium methanesulfate on sudden death due to experimental acute myocardial infarction. The tests were carried out using mongrel dogs of either sex and anesthetizing the dogs with pentobarbital. The dogs remained on positive pressure respiration, and their chests were open during the experiments. The left descending coronary artery was occluded about 1–5 mm below the circumflex branch with a snare. Thirteen dogs were given an intravenous bolus of the tertiary amine five minutes before the occlusion. The remaining 13 dogs were given a similar dose of the quaternary ammonium salt by the same route five minutes before the occlusion. During the occlusion, 77 percent of the tertiary amine-treated dogs died due to ventricular fibrillation in less than four minutes on the average, whereas only 54 percent of the quaternary ammonium salt-treated dogs fibrillated and died, and then only after an average time of about 13 minutes.

TABLE II

| Drug | Dose mg/Kg. | No. of Dogs | Died During Occlusion | Time of Death (Minutes Occlusion) | Survived Occlusion |
|---|---|---|---|---|---|
| Tertiary amine | 2 | 5 | 3 | 4.90 | 2 |
| | 4 | 2 | 2 | 3.11 | 0 |
| | 8 | 6 | 5 | 3.48 | 1 |
| Total | | 13 | 10 | Avg.= 3.83 | 3 |
| Quaternary Salt | 1 | 3 | 1 | 10.45 | 2 |
| | 2 | 2 | 1 | 12.50 | 1 |
| | 4 | 2 | 2 | 13.90 | 0 |
| | 8 | 6 | 3 | 15.20 | 3 |
| Total | | 13 | 7 | Avg.=13.01 | 6 |

As can be seen from the table, death occurs less frequently for dogs given the quaternary salt, and for those dogs that were given the quaternary salt, death was substantially delayed when compared with the tertiary amine-treated dogs.

The compounds of this invention are preferably used for the control of cardiac arrhythmias in humans. The compounds can be administered by the oral route, or alternatively the compounds can be administered parenterally, either intramuscularly or by intravenous administration in cases of severe arrhythmia. A typical method of treatment consists of initial intravenous administration until the arrhythmia has been converted to a normal sinus rhythm. The intravenous preparation comprises a compound of this invention in a solution with a suitable carrier, such as 0.9 percent saline or 5 percent glucose solution for example. Generally, the solution will contain from about 0.01 to about 1.0 g. of the antiarrhythmic agent in about 50 to 100 cc. of solvent. The preparation can be administered slowly over a period of about 5 to 20 minutes. After normal sinus rhythm has been established, oral administration of the compound of this invention is preferred. Generally, the oral dose will be administered in amounts of about 0.05 to 2.0 g., normally at time intervals of about 1 to 6 hours. The compound of this invention is preferably administered orally for therapeutic as well as prophylactic arrhythmia treatment.

The following detailed examples are presented to more fully illustrate the invention and are not intended

EXAMPLE 1

Diethylmethyl-3-[N-(2-indanyl)anilino]propylammonium iodide.

A solution of 6 g. of diethyl-3-[N-(2-indanyl)-anilino]propylamine in 100 cc. of diethyl ether was stirred at room temperature while 5 g. of methyl iodide was added in one portion. The reaction mixture was stirred at ambient temperature for twelve hours. The crystalline product was collected by filtration and recrystallized from water, providing 5 g. of diethylmethyl-3[N-(2-indanyl)anilino]propylammonium iodide, as a monohydrate. M.P. 77°–79°C.

Analysis Calc. for $C_{23}H_{33}N_2I \cdot H_2O$ (percent): C, 57.26; H, 7.31; N, 5.81; O, 3.32. Found (percent): C, 57.27; H, 7.37; N, 5.96; O, 3.02.

EXAMPLE 2

Diethylmethyl-3[N-(2-indanyl)anilino]propylammonium methanesulfate.

To a solution of 3.22 g. of diethyl-3[N-(2-indanyl)-anilino]propylamine in 50 cc. of benzene was added 1 cc. of dimethyl sulfate. The reaction mixture was stirred at room temperature for about twelve hours. The solvent was removed under reduced pressure to provide the product which was recrystallized from ethyl acetate. The colorless crystals were collected by filtration, providing 4.3 g. of diethylmethyl-3-[N-(2-indanyl)anilino[propylammonium methanesulfate. M.P. 60°–80°C.

Analysis Calc. for $C_{24}H_{36}N_2O_4S$ (percent): C, 64.25; H, 8.09; N, 6.24. Found (percent): C, 64.10; H, 7.80; N, 6.30.

EXAMPLE 3

Allyldiethyl-3[N-(2-indanyl)anilino]propylammonium bromide.

A solution of 3.22 g. of diethyl-3[N-(2-indanyl)-anilino]propylamine in 50 cc. of benzene was stirred at room temperature while 1.21 g. of allyl bromide was added in one portion. The reaction mixture was stirred for three days at room temperature and then heated at reflux for eighteen hours. The reaction mixture was cooled to room temperature and the crystalline product was filtered and recrystallized from acetone, providing 3.54 g. of allyldiethyl-3[N-(2-indanyl)-anilino]-propylammonium bromide as colorless needles. M.P. 151°–152°C.

Analysis: Calc. for $C_{25}H_{35}NBr$ (percent): C, 67.71; H, 7.96; N, 6.32; Br, 18.02. Found (percent): C, 67.43; H, 8.11; N, 6.40; Br, 18.25.

EXAMPLE 4 n-Butyldiethyl-3[N-(2-indanyl)anilino]propylammonium bromide.

A solution of 3.22 g. of diethyl-3[N-(2-indanyl)-anilino]propylamine in 50 cc. of n-butyl bromide was heated at reflux for twelve hours. After cooling the reaction mixture to room temperature, the crystalline product was filtered, washed with benzene, and recrystallized from acetone. Colorless needles of n-butyl-diethyl-3[N-(2-indanyl)anilino]propylammonium bromide were collected by filtration and dried. M.P. 182°–183°C.

Analysis: Calc. for $C_{26}H_{39}N_2Br$ (percent): C, 67.96; H, 8.56; N, 6.10; Br, 17.39. Found (percent): C, 67.90; H, 8.45; N, 5.95; Br, 17.13.

EXAMPLE 5

Triethyl-3[N-(2-indanyl)anilino]propylammonium chloride.

A solution of 2.85 g. of 3[N-(2-indanyl)anilino]-propylchloride in diethyl ether was stirred while 1.5 g. of triethylamine was added in one portion. The reaction mixture was stirred at room temperature for twelve hours, and the mixture was filtered to provide triethyl-3[N-(2-indanyl)-anilino]propylammonium chloride as a crystalline residue.

EXAMPLE 6

Triethyl-3[N-(2-indanyl)anilino]propylammonium hydroxide.

A solution of 3.86 g. of triethyl-3[N-(2-indanyl)-anilino]propylammonium chloride in 100 cc. of acetone was stirred with 5 g. of aqueous silver oxide for eight hours. Filtration of the reaction mixture and evaporation of the solvent from the filtrate afforded triethyl-3[N-(2-indanyl)-anilino]propylammonium hydroxide.

EXAMPLE 7

Triethyl-3[N-(2-indanyl)anilino]propylammonium methanesulfonate.

Two grams of triethyl-3[N-(2-indanyl)anilino]-propylammonium hydroxide was dissolved in an aqueous solution of 1 g. of methanesulfonic acid. The reaction mixture was stirred for two hours at room temperature. The solvent was removed under reduced pressure to provide triethyl-3[N-(2-indanyl)anilino]-propylammonium methanesulfonate.

EXAMPLES 8–11

The following compounds are prepared by the methods of the above examples, from the corresponding N-dialkylaminoalkyl-N-(2-indanyl)aniline.

Allyldimethyl-3[N-(2-indanyl)anilino]propylammonium bromide;

Allylethylmethyl-2[N-(2-indanyl)anilino]ethylammonium hydroxide;

Di-n-propylmethyl-3[N-(2-indanyl)anilino]propylammonium methanesulfate.

We claim:
1. The compound of the formula wherein:
  $n$ is 2 or 3;
  $R_1$ and $R_2$ independently are $C_1$–$C_4$ alkyl, or $R_1$ and $R_2$ together with the adjacent nitrogen atom form a heterocyclic ring system selected from among pyrrolidino, piperidino, or morpholino;
$R_3$ is hydrogen, $C_1$–$C_3$ alkyl, or $C_2$–$C_5$ alkenyl;
$R_4$ is hydrogen, methyl, methoxy, trifluoromethyl, or chloro; and
X is a pharmaceutically acceptable anion.

2. The compound of claim 1, wherein $R_1$ and $R_2$ independently are $C_1$–$C_4$ alkyl, and $R_4$ is hydrogen.

3. The compound of claim 2, wherein $n$ is 3.

4. The compound of claim 3, wherein $R_1$ and $R_2$ are both ethyl.

5. The compound of claim 4, wherein X is bromide.

6. The compound of claim 4, wherein X is chloride.

7. The compound of claim 4, wherein X is iodide.

8. The compound of claim 4, wherein X is methanesulfate.

\* \* \* \* \*